Jan. 5, 1965    J. SCHMAHL ETAL    3,164,013
DISPLACEMENT INDICATOR ARRANGEMENT
Filed May 13, 1960    3 Sheets-Sheet 3

*INVENTOR.*
*JOSEF SCHMAHL*
*HERMANN ROELIG*

United States Patent Office 3,164,013
Patented Jan. 5, 1965

3,164,013
DISPLACEMENT INDICATOR ARRANGEMENT
Josef Schmahl, Leverkusen-Wiesdorf, and Hermann
Roelig, Leverkusen, Germany, assignors, by mesne
assignments, to Farbenfabriken Bayer Aktiengesellschaft, Leverkusen, Germany
Filed May 13, 1960, Ser. No. 28,996
Claims priority, application Germany, May 20, 1959,
F 28,473
10 Claims. (Cl. 73—141)

The present invention concerns an arrangement for indicating the displacement of a mechanical member out of a given position, such displacement being sometimes the consequence of the application of an external force to such member. Specifically, the invention concerns an arrangement whereby such displacements are converted into proportionate electrical values so that the magnitude of such values in electrical units is indicative of the amount of displacement generating such electrical values.

In the conversion of measured values of mechanical nature, e.g. amounts of displacement of a mechanical member and forces causing such displacements, into units of electrical measurement (voltages, currents, resistances) for the purposes of indication, registration, transmission to a remote point or control operations the following conditions must be met by the transducer means converting the amounts of displacement into electrical units:

(1) Proportionality between the values of mechanical nature and the electrical values;
(2) Stable and simple structure of the transducer;
(3) High electro-mechanical efficiency;
(4) Insensitiveness to outside disturbances e.g., the influences of temperature, vibrations, extraneous fields, even those acting over an extended period;
(5) Capability of being statically calibrated also for dynamic measurements;
(6) In the case of dynamic measurements, tolerably low dependence of the phase and amplitude of the electrical values on variations of frequency;
(7) Low reactance in the case of measurements carried out with a carrier frequency.

It is a main object of this invention to provide for an arrangement satisfying all the above conditions.

It is a further object of this invention to provide an arrangement capable of furnishing indications of very minute displacements of a mechanical member with extreme accuracy.

With above objects in mind, a displacement indicator arrangement according to the invention, comprises, in combination, magnet means for setting up a magnetic field having at least a portion wherein a gradient of said field is oriented in a predetermined plane; Hall plate means mounted movably in said portion of said magnetic field for generating, depending on a displacement thereof in direction of said gradient, a corresponding output potential; electric means for applying an operating current to said Hall plate means; moving means for displacing said Hall plate means in the direction of said gradient; and indicating means conductively connected with said Hall plate means for indicating variations of said output potential indicative of the amount of said displacement of said Hall plate means causing such variations.

In a more elaborate modification of above arrangement, the indication of a displacement is indirectly indicative of a force, applied to the displaced member.

A basic embodiment of the invention would consist in an arrangement comprising a single magnet having two pole pieces with a Hall plate mounted movably in one direction only in the field set up by the magnet. However, as a rule not only the magnitude of a displacement but also its direction should be indicated. In such a case, in a preferred embodiment of the invention, the magnet is constructed as a twin magnet with a plurality of pole pieces defining between themselves a gap in which the lines of force of the magnetic field are oriented substantially parallel with each other and having opposite directions in different portions of that field, the Hall plate member being mounted movably in said gap. In a particularly advantageous form of such an embodiment, the magnet is provided with three pole pieces, two of which are aligned with each other in a common plane while the third one is oriented perpendicularly to said plane. In order to accurately predetermine the magnetic flux in the magnetic field it is of particular advantage to use adjustable electromagnets. In a modified preferred embodiment of the invention, the Hall plate member is connected across an electrical bridge circuit and is connected therein with the tap of a potentiometer. In this case, this potentiometer can be adjusted for any occurring displacement of the Hall plate member in such a maner that the output potential furnished by the Hall plate member is reduced to zero. Consequently, in such an arrangement the setting of the potentiometer, which may be calibrated for this purpose, is a measurement or indication of the prevailing displacemnt of the Hall plate member. The adjustment of the potentiometer in this procedure may be carried out automatically by means of an auxiliary circuit containing amplifier means and a servo-motor arrangement.

In a case where the displacement indicator arrangement according to the invention is to be utilized as a dynamometer, the force to be measured or indicated may be applied to one end or side of a spring member, while a correcting force furnished by the servo-motor via transmission means to the Hall plate member to be displaced is applied to the opposite end or side of the spring member so that the displacement of the spring at the point where the correcting force is applied and being proportional to the applied force to be measured or indicated, would indicate the magnitude of such force. In this case the Hall plate member can be rigidly connected with that element of the arrangement to which the force to be measured is applied. Since the operation of the servo-motor control would start to take place already in response to a minute, ordinarily not perceptible displacement of the Hall plate member, those elements of the arrangement to which the force to be measured is applied remain practically stationary.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figure 3:
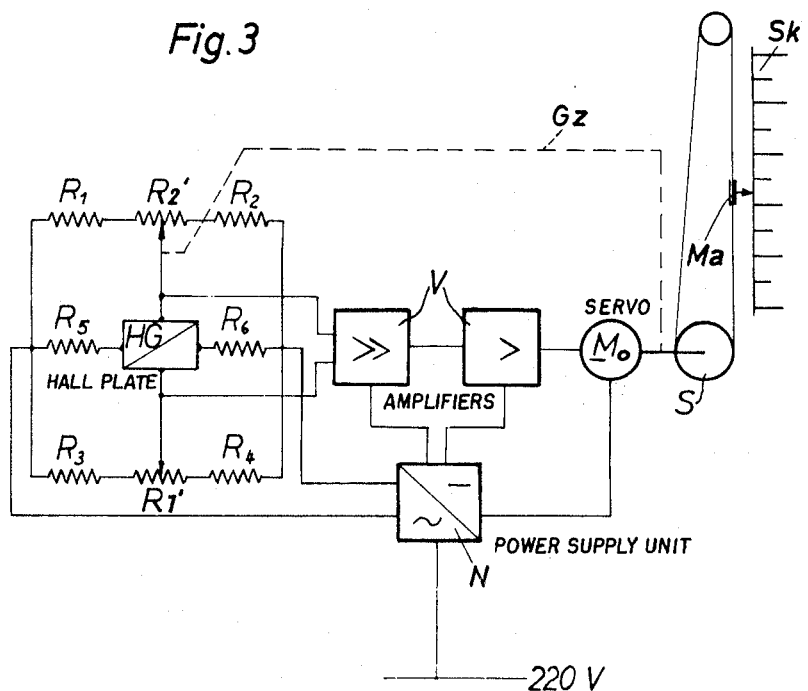
Figure 4:
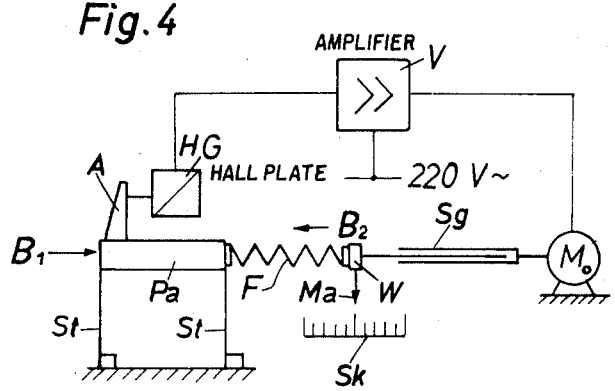

FIG. 3 is a diagrammatic illustration of an arrangement of the invention comprising a bridge circuit, and including servo-motor means for controlling the adjustment of the bridge; and FIG. 4 is a diagrammatic illustration of an arrangement according to the invention specifically suitable for dynamometric use, the details of the bridge circuit pertaining to this arrangement being omitted for the sake of clarity.

Before describing the various embodiments illustrated in the drawings, it should be understood that a Hall plate means is a device well known per se. Reference is made e.g. to the Scientific Encyclopedia, published by Van Nostrand Co., Inc., New York, New York, January 1958, page 784, where it is stated that in a strip of certain metal, carrying an electric current longitudinally and placed in a magnetic field with the plane of the strip perpendicular to the direction of the field, points directly opposite each other on the edges of the strip acquire a difference of electric potential, and if such points were joined through a sensitive galvanometer a feeble current would be indicated. Consequently, the electric lines of flow of current in the plate are deflected to one side. If one looks along the strip in the direction of the current, with the magnetic field directed downward, then with strips of antimony, cobalt, zinc, or iron the electric potential drop is toward the right and the effect is said to be positive; while with gold, silver, platinum, nickel, bismuth, copper and aluminum, it is toward the left and the effect is called negative.

A second reference is the book "Electrons and Holes in Semiconductors," by W. Shockley, published by Van Nostrand Co., Inc., New York, New York, January 1953, pages 210 and 211. On page 210 FIGS. 8-9 illustrate Hall plate members as referred to above and having strip form with an electric current flowing in longitudinal direction and an output potential appearing in transverse direction under the influence of a magnetic field having its lines of force oriented perpendicularly to the plane of the strip member. In the description of these figures it is stated "the current flows parallel to the long dimension which is supposed to be large compared to the transverse dimensions. When a magnetic field is supplied to such a sample, it deflects the current carriers to one side and causes the current to deviate from the direction of the electric field. During the initial transient phase, while the magnetic field is building up, a transverse current actually flows in the specimen and carries a charge across it from one side to the other. This charge accumulates on the two opposite faces, making one positive and the other negative, and sets up a transverse electric field."

Figure 1:
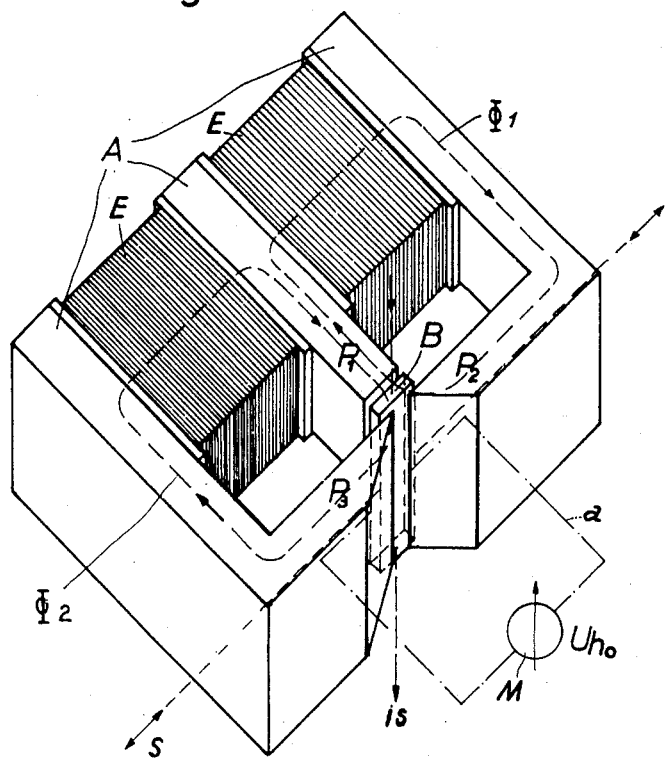
FIG. 1 is a diagrammatic three-dimensional view of a portion of the arrangement according to the invention, comprising an electromagnet having three pole pieces with a Hall plate member arranged in the gap between these pole pieces.

Referring now to FIG. 1, it can be seen that an E-shaped yoke or core A made of iron is provided with energizing windings E and with three pole pieces $P_1$, $P_2$ and $P_3$, respectively. A gap is provided between the respective ends of said pole pieces, and in this gap a Hall plate member B is so arranged that it is movable within the gap in the directions indicated by the arrow s i.e., parallel with the plane of the aligned pole pieces $P_2$ and $P_3$. The various portions of the magnetic yoke A, $P_1$, $P_2$ and $P_3$ and the above mentioned gap constitute the paths for two magnetic fluxes $\Phi_1$ and $\Phi_2$ which have mutually opposite direction in the pole pieces $P_1$ and in the gap. Thus these two fluxes compensate each other in the plane occupied by the Hall plate member B provided that this plate member B is located in a central neutral position. The member B is subjected to the flow of an operating current $i_s$ in its longitudinal direction as indicated by the arrow marked $i_s$. It will be understood, as long as the Hall plate member B is in the shown neutral position the output potential available at edge points thereof located opposite each other in transverse direction is zero. A circuit a comprising an indicating instrument M is shown diagrammatically as being connected to the above mentioned edge points of the member B. Whenever the Hall plate member B is displaced from its illustrated zero position in either one of the directions s an output potential or voltage $U_{ho}$ is generated the magnitude of which is a precise indication of the amount of such a displacement of the member B, the polarity of this voltage indicating the direction of the displacement toward one or the other side. Depending on the type of the operating current $i_s$ either direct current or alternating voltages of about 10 mv. per .1 mm. displacement are obtained and may be read directly at the meter M or supplied to a recording instrument of very simple conventional structure.

Figure 2A:
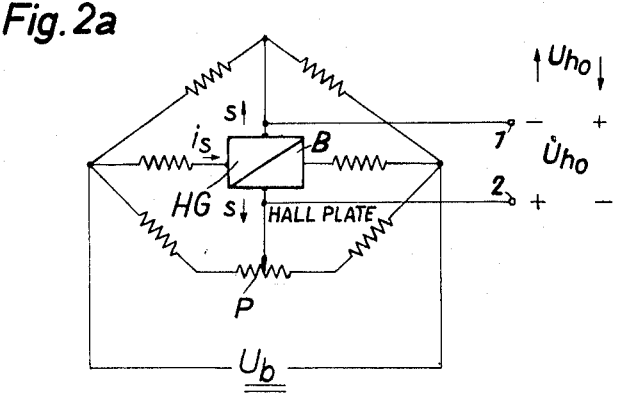
FIG. 2a is a circuit diagram illustrating the connection of a Hall plate member of an embodiment of the invention, across a bridge circuit operated with direct current.
Figure 2B:
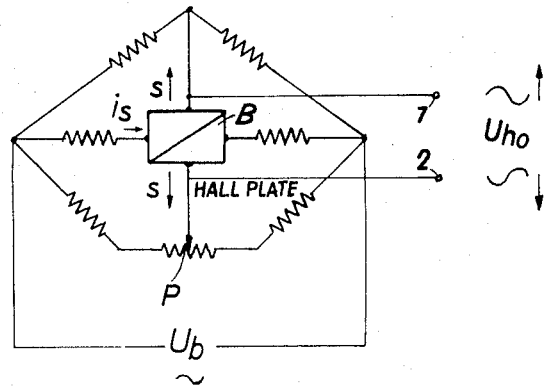
FIG. 2b is a similar circuit diagram with a bridge circuit operated with alternating current.

While in FIG. 1 the electrical connections of the Hall plate member B have been shown only diagrammatically, FIGS. 2a and 2b illustrate bridge circuits in which the Hall plate member B of FIG. 1 is connected within that circuit. In this arrangement, the Hall plate output potential created by a displacement in either one of the directions s is compensated by the diagonal voltage of the bridge circuit. By balancing the bridge circuit in the conventional manner, e.g. by adjusting the tap of a calibrated potentiometer P the amount of displacement of the member B can be read directly on the calibration of the potentiometer P. In this case the operating current $i_s$ is in this case proportional to the bridge voltage whereby the advantage is obtained that variations of the outside voltage $U_b$ applied to the bridge are without influence on the result of the measurement carried out. The example of FIG. 2a is based on the assumption that the operating voltage $U_b$ is direct current voltage so that at the output terminals 1 and 2 of the Hall member B the output potential $U_{ho}$ has one or the other direct current polarity depending upon the direction of the displacement s as indicated by the arrows.

The example of FIG. 2b refers to the application of an alternating voltage $U_b$ to the identical bridge circuit in which case the output potential $U_{ho}$ available at the output terminals 1 and 2 upon displacement of the member B in directions s is also an alternating voltage. In this case a transformer may be used for operating the bridge circuit at comparatively high voltages. In this case, again the dimension of the displacement of the member B is indicated by the amplitude of the output potential $U_{ho}$, but the direction of the displacement is indicated by a phase shift of 180° upon a reversal of the direction of the displacement.

In the arrangement illustrated by FIG. 3 a power supply unit N is connected with a general line furnishing 220 volts. The unit N furnishes the operating voltage for the bridge circuit described below and for two amplifiers V. The bridge circuit comprises resistors $R_1$ to $R_6$ functioning in the well known manner, and two potentiometers $R_{1'}$ and $R_{2'}$ of which the first one serves for adjusting the bridge circuit. The output voltage of the Hall plate member HG is amplified by the amplifiers V and applied to a servo-motor $M_o$ which, depending upon the polarity or phase of the applied voltage adjusts via mechanical or other transmission means $G_z$ the tap of the potentiometer $R_{2'}$ until the voltage output of the Hall plate member HG is compensated. At the same time, the servo-motor $M_o$ shifts by means of a transmission S an index member Ma along a graduation Sk in such a manner that at any time the setting of the index Ma indicates the amount of displacement of the Hall plate member HG in accordance with the above mentioned adjustment of the potentiometer $R_{2'}$. FIG. 4 illustrates an embodiment of the invention serving as a dynamometer. In this case a plate member Pa is supported by two rod members St which may be blade springs rigidly attached at the lower ends thereof to a stationary body. Thus, the plate member Pa is movable in horizontal direction. The Hall plate member HG is mounted by means of a supporting bracket A on the plate Pa. The details of the electric circuits connected with the member HG are omitted in this illustration for the sake of clarity. A spring F is arranged in such a manner that it abuts at one end against one end of the plate member Pa and at its opposite end against a support W the variable positions whereof are indicated by the index Ma along a graduation Sk. The support W is shiftable in horizontal direction by the action of the servo-motor $M_o$ by means of threaded spindle and rod arrangement of conventional type, at a speed which corresponds to the output potential furnished by the Hall plate member HG, upon its displacement, via the amplifier V.

Whenever a force $B_1$ is applied to the plate member $Pa$ in the direction of the arrow shown in FIG. 4, the Hall plate HG is correspondingly shifted in the gap of the magnet, not shown. Thereby an output potential is generated and furnished, after amplification by the amplifier V, to the motor $M_0$ so that consequently the support member W is shifted under the action of the transmission $Sg$ so as to exert a force $B_2$ of equal magnitude as the force $B_1$ to the attached end of the spring F whereby the plate member $Pa$ is moved to the left as seen in FIG. 4, until this plate $Pa$ carrying the Hall plate HG is returned to its orignal zero position. Consequently the entire amount of spring displacement can be read directly by the position of the index $Ma$ on the graduation $Sk$. The servo-control system can be built without difficulty so as to have very little inertia or time lag so that practically at every moment the forces $B_2$ and $B_1$ are equal to each other. Since the Hall plate member HG responds already to the most minute, otherwise hardly perceptible displacements thereof from its zero position the measurement of the applied force takes place substantially without any noticeable movements of the movable members $Pa$ and HG, i.e., the plate member $Pa$ is actually not shifted by the applied force $B_1$.

It is evident that alternatively or additionally any type of recording means can be added to, or substituted for, the indicating arrangement $Ma$ and $Sk$.

It will be understood that each of the elements described above or two or more together, may also find a useful application in other types of displacement indicator arrangement differing from the types described above.

While the invention has been illustrated and described as embodied in displacement indicator arrangement measuring displacements of mechanical members in terms of electrical units, it is not intended to be limited to the details shown, since various modifications and structural changes may be made without departing in any way from the spirit of the present invention.

Without further analysis the foregoing will so fully reval the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. Displacement indicator arrangement, comprising, in combination, magnetic force exerting means for setting up a magnetic field having at least a portion wherein a gradient of said field is oriented in a predetermined plane, said magnetic force exerting means including a twin magnetic circuit arrangement having a pluraltiy of pole pieces determining between themselves a gap in which the lines of force of said field are oriented in parallel with each other and constitute magnetic fluxes having relatively opposed directions; Hall plate means mounted movably in said portion of said field for generating, depending on a displacement thereof in direction of said gradient, a corresponding output potential, said Hall plate means being arranged in said gap; electric means for applying an operating current to said Hall plate means; moving means for displacing said Hall plate means in a direction parallel with said gradient; and indicating means operatively connected with said Hall plate means for indicating variations of said output potential indicative of the amount of displacement of said Hall plate means causing such variations.

2. An arrangement as claimed in claim 1, adapted to serve as a dynamometer, wherein said moving means include first movable support means carrying said Hall plate means and being movable in said direction by a force to be measured and acting to move said support means in said direction, said arrangement further including second movable support means, spring means interposed between said first and second support means for being deformed when at least one of said support means is moved from a normal position to a displaced position, servo-motor means for moving said second support means, amplifier means connected between the terminals of said Hall plate means furnishing said output potential and said servo-motor means for moving said second support means in a direction opposite to a movement of said first support means caused by the application of said force to be measured until the force applied to said second support means by the action of said servo-motor means balances said force to be measured, whereby said Hall plate means is returned from a displaced position to its normal position, the amount of displacement of said second support means required for balancing said forces being indicative of the magnitude of the force to be measured.

3. Displacement indicator arrangement, comprising, in combination, magnetic force exerting means for setting up a magnetic field having at least a portion wherein a gradient of said field is oriented in a predetermined plane, said magnetic force exerting means including a twin magnetic circuit arrangement having three pole pieces of which two are aligned with each other in a common plane, the third one being oriented perpendicular to said common plane, said pole pieces determining between themselves a gap in which the lines of force of said field are oriented in parallel with each other and constitute magnetic fluxes having relatively opposed directions; Hall plate means mounted movably in said portion of said field for generating, depending on a displacement thereof in direction of said gradient, a corresponding output potential, said Hall plate means being arranged in said gap; electric means for applying an operating current to said Hall plate means; moving means for displacing said Hall plate means in a direction parallel with said gradient; and indicating means operatively connected with said Hall plate means for indicating variations of said output potential indicative of the amount of displacement of said Hall plate means causing such variations.

4. An arrangement as claimed in claim 3, adapted to serve as a dynamometer, wherein said moving means include first movable support means carrying said Hall plate means and being movable in said direction by a force to be measured and acting to move said support means in said direction, said arrangement further including second movable support means, spring means interposed between said first and second support means for being deformed when at least one of said support means is moved from a normal position to a displaced position, servo-motor means for moving said second support means, amplifier means connected between the terminals of said Hall plate means furnishing said output potential and said servo-motor means for moving said second support means in a direction opposite to a movement of said first support means caused by the application of said force to be measured until the force applied to said second support means by the action of said servo-motor means balances said force to be measured whereby said Hall plate means is returned from a displaced position to its normal position, the amount of displacement of said second support means required for balancing said forces being indicative of the magnitude of the force to be measured.

5. Displacement indicator arrangement, comprising, in combination, electromagnet means of electrically adjustable magnetic force for setting up a magnetic field having at least a portion wherein a gradient of said field is oriented in a predetermined plane, said electromagnet means being a twin magnetic circuit arrangement having three pole pieces of which two are aligned with each other in a common plane, the third one being oriented perpendicular to said common plane, said pole pieces determining between themselves a gap in which the lines of force of said field are oriented in parallel with each other and constitute magnetic fluxes having relatively opposed directions; Hall plate means mounted movably in said portion of said field for generating, depending on a displacement thereof in direction of said gradient, a corresponding output potential, said Hall plate means being arranged in said gap; electric means for applying an operating current to said Hall plate means; moving means for displacing said Hall plate means in a direction parallel with said gradient; and indicating means operatively connected with said Hall plate means for indicating variations of said output potential indicative of the amount of displacement of said Hall plate means causing such variations.

6. An arrangement as claimed in claim 5, adapted to serve as a dynamometer, wherein said moving means include first movable support means carrying said Hall plate means and being movable in said direction by a force to be measured and acting to move said support means in said direction, said arrangement further including second movable support means, spring means interposed between said first and second support means for being deformed when at least one of said support means is moved from a normal position to a displaced position, servo-motor means for moving said second support means, amplifier means connected between the terminals of said Hall plate means furnishing said output potential and said servo-motor means for moving said second support means in a direction opposite to a movement of said first support means caused by the application of said force to be measured until the force applied to said second support means by the action of said servo-motor means balances said force to be measured whereby said Hall plate means is returned from a displaced position to its normal poistion, the amount of displacement of said second support means required for balancing said forces being indicative of the magnitude of the force to be measured.

7. Displacement indicator arrangement, comprising, in combination, magnetic force exerting means for setting up a magnetic field having at least a portion wherein a gradient of said field is oriented in a predetermined plane, said magnetic force exerting means including a twin magnetic circuit arrangement having three pole pieces determining between themselves a gap in which the lines of force of said field are oriented in parallel with each other and constitute magnetic fluxes having relatively opposed directions; Hall plate means mounted movably in said portion of said field for generating, depending on a displacement thereof in direction of said gradient, a corresponding output potential, said Hall plate means being ararnged in said gap; electric means for applying an operating current to said Hall plate means; moving means for displacing said Hall plate means in a direction parallel with said gradient; bridge circuit means including at least one potentiometer means, said Hall plate means being connected with its terminals furnishing said output potential in a bridge diagonal between one nodal point of said bridge circuit and the movable tap of said potentiometer means; a source of electric potential for applying an operating potential to said bridge circuit; and indicating means operatively connected with said Hall plate means for indicating variations of said output potential indicative of the amount of displacement of said Hall plate means causing such variations.

8. An arrangement as claimed in claim 7, including servo-motor means for adjusting said potentiometer means, said amplifier means connected between said terminals of said Hall plate means and said servo-motor means for applying said output potential to said servo-motor means so as to cause said output potential of said Hall plate means to be compensated by balancing said bridge circuit by adjusting said potentiometer means, the amount of adjustment of said potentiometer means required for balancing said bridge circuit being indicative of the displacement of said Hall plate means necessitating said adjustment.

9. Displacement indicator arrangement, comprising, in combination, electromagnet means of electrically adjustable magnetic force for setting up a magnetic field having at least a portion wherein a gradient of said field is oriented in a predetermined plane, said electromagnet means being a twin magnetic circuit arrangement having three pole pieces of which two are aligned with each other in a common plane, the third one being oriented perpendicular to said common plane, said pole pieces determining between themselves a gap in which the lines of force of said field are oriented in parallel with each other and constitute magnetic fluxes having relatively opposed directions; Hall plate means mounted movably in said portion of said field for generating, depending on a displacement thereof in direction of said gradient, a corresponding output potential, said Hall plate means being arranged in said gap; electric means for applying an operating current to said Hall plate means; moving means for displacing said Hall plate means in a direction parallel with said gradient; bridge circuit means including at least one potentiometer means, said Hall plate means being connected with its terminals furnishing said output potential in a bridge diagonal between one nodal point of said bridge circuit and the movable tap of said potentiometer means; a source of electric potential for applying an operating potential to said bridge circuit; and indicating means operatively connected with said Hall plate means for indicating variations of said output potential indicative of the amount of displacement of said Hall plate means causing such variations.

10. An arrangement as claimed in claim 9, including servo-motor means for adjusting said potentiometer means, and amplifier means connected between said terminals of said Hall plate means and said servo-motor means for applying said output potential to said servo-motor means so as to cause said output potential of said Hall plate means to be compensated by balancing said bridge circuit by adjusting said potentiometer means, the amount of adjustment of said potentiometer means required for balancing said bridge circuit being indicative of the displacement of said Hall plate means necessitating said adjustment.

References Cited by the Examiner
UNITED STATES PATENTS

| 2,620,657 | 12/52 | Stovall | 73—141 X |
|---|---|---|---|
| 2,906,945 | 9/59 | Weiss | 324—46 X |
| 2,987,669 | 6/61 | Kallmann | 324—45 |

FOREIGN PATENTS

| 330,543 | 7/58 | Switzerland. |
|---|---|---|
| 681,537 | 9/39 | Germany. |

RICHARD C. QUEISSER, *Primary Examiner.*

L. M. McCOLLUM, W. L. CARLSON, *Examiners.*